UNITED STATES PATENT OFFICE.

HERMAN CHARLES WOLTERECK, OF WESTMINSTER, LONDON, ENGLAND, ASSIGNOR TO THE ESCHWEILER-WOLTERECK PROCESS SYNDICATE, LIMITED, OF LONDON, ENGLAND, A CORPORATION OF ENGLAND.

PROCESS OF MAKING AMMONIA BY SYNTHESIS.

No. 803,651.     Specification of Letters Patent.     Patented Nov. 7, 1905.

Application filed August 18, 1902. Serial No. 120,110.

*To all whom it may concern:*

Be it known that I, HERMAN CHARLES WOLTERECK, a citizen of the United States, residing at 3 Edinburgh Mansions, Howick Place, Victoria street, Westminster, London, England, have invented a certain new and useful Process of Producing Ammonia by Synthesis, of which the following is a specification.

This invention relates to the production of ammonia by synthesis, and has for its object to render the product cheaper and to increase the available supply.

I have observed that ammonia is always formed when a mixture of pure hydrogen and nitrogen is passed over reduced iron heated to a dark-red heat. This formation, however, soon ceases, and a careful study of the conditions has demonstrated that the formation was due to the presence of oxygen in the form of iron oxid, since iron freshly reduced by hydrogen and not exposed to the air will not produce a trace of it. Careful experiments have shown that the presence of oxygen is essential to the formation of ammonia and that the contact material employed must be able to act as a carrier of oxygen.

To carry my invention into effect, I pass a mixture of air and a gas-containing hydrogen—such as coal-gas or water-gas—in about equal quantities and saturated with steam over iron oxid heated to a dull-red heat or other metallic oxid adapted to act as a carrier of oxygen. The oxid is advantageously disposed in such a manner as to offer the most intimate contact and largest surface to the mixture of gases employed. When coal-gas is employed, a quantity of organic amins is produced which may be destroyed to liberate the ammonia by passing the gases through boiling caustic solutions or over heated lime before absorbing the ammonia in acid in the ordinary manner.

I have found that rolls of iron wire-netting thoroughly oxidized before being used for this process constitute an excellent contact material.

What I claim, and desire to secure by Letters Patent of the United States, is—

The process of producing ammonia by synthesis, which consists in passing a mixture of air and gas containing hydrogen and saturated with steam over iron oxid heated to a temperature between 300° centigrade and 400° centigrade, substantially as described.

In testimony whereof I affix my signature in presence of two witnesses.

HERMAN CHARLES WOLTERECK.

Witnesses:
   HERBERT STANLEY SNYDER,
   WALTER E. ROCHE.